UNITED STATES PATENT OFFICE.

MORCRETTE DELAFOND, OF MEXICO, MEXICO.

RECOVERY OF RUBBER.

966,385.  Specification of Letters Patent.  Patented Aug. 2, 1910.

No Drawing.   Application filed April 19, 1909. Serial No. 490,939.

*To all whom it may concern:*

Be it known that I, MORCRETTE DELAFOND, a citizen of the Republic of France, residing at and whose post-office address is Apartado Correo 1288, Mexico city, Mexico, have invented certain new and useful Improvements in the Recovery of Rubber; and I do hereby declare the following to be a full, clear, and exact description of the invention, such as will enable others skilled in the art to which it appertains to make and use the same.

My invention relates to the extraction and purification of rubber from rubber bearing plants, especially such as guayule (*Parthenium argentatum*).

Heretofore it has been the practice to grind the plants and thereby agglomerate the rubber and rubber vesicles with the resins contained in the plants. This procedure necessitated expensive and tedious methods of purification in order to separate the resins intimately mixed with the rubber.

My improved process has for its object to overcome to a great degree the disadvantages of such methods at the same time considerably cheapening the process of extraction of the rubber and consists, so to speak of effecting the purification of the rubber in the plant itself.

In carrying out my present new method I first soak the rubber plants, especially guayule for from four to five days in cold water. By cold water I mean water as it comes from springs and streams, usually at a temperature below 100° F. If not sufficiently cold the water may be cooled by any well known means, as by adding ice. This produces a slow separation of the resins contained in the bark or skin and causes them to traverse their cell walls in the plant and collect in small soft globules on the surface of the plants effecting a sort of transpiration. I now proceed to remove the exuded resins and this I do by heating the plants and water containing them to a temperature sufficient to liquefy or melt the exuded resins, which temperature is about from 90 to 92 degrees centigrade, or I accomplish the same thing by washing them in hot water at such a temperature. The resins detach themselves from the plants, rise to the surface of the water and are floated off leaving practically pure caoutchouc or rubber remaining in the plants.

In the interior of the plant or heart-wood, alburnum and duramen, there are contained resins unmixed with caoutchouc or rubber which if allowed to remain would become mixed with the rubber during the grinding usually performed for the purpose of agglomerating the rubber vesicles. These resins when cold are heavier than water but when heated melt and float on water. I therefore use during the grinding of the plants boiling water so as to maintain a temperature of the ground mass at 90° centigrade or over, and allow the hot pulp so produced to flow off into a body of cold water whereupon the dense resins congeal and sink with the wood fiber leaving almost pure rubber floating on the surface of the cold water. This rubber is collected and purified in any known manner.

In lieu of the above described procedure I may also submit the crushed rubber plants before grinding to the action of steam in a centrifugal separator. The steam liquefies the resins which are carried out of the machine with the condensed steam by centrifugal action leaving behind the wood fiber with the rubber. The crushed and ground rubber plants may be similarly treated with live steam in a centrifugal separator, a pulp of the crushed and finely ground plants being fed to the separator with a jet of live steam in which case the rubber will remain held in suspension in the machine.

Although I prefer the above described method of treatment on account of its simplicity and cheapness, chemical solvents of the resins may be added to the water to aid the separation.

I claim:

1. In the method of treating rubber plants the step which comprises exuding the resins contained in the bark of the plant and removing them.

2. In the method of treating rubber plants the step which comprises soaking the plants in cold water until the resins contained in the bark or skins are exuded and removing the exuded resins.

3. The method of treating rubber plants which comprises exuding the resins contained in the bark or skin of the plant and then melting and removing the exuded resins.

4. The method of treating rubber plants which comprises soaking the plants in cold water until the resins contained in the bark or skin are exuded and then heating the plants and water until the exuded resins are melted and float on the surface of the water.

5. The method of treating rubber plants which comprises first removing the bark resins, then grinding the plants and separating the denser resins and wood fiber from the rubber.

6. The method of treating rubber plants which comprises first removing the resins from the bark or skin, then grinding the plants in hot water, and precipitating the remaining resins and wood fiber from the rubber.

7. The method of treating rubber plants which comprises first removing the resins from the bark or skin, then grinding the plants in hot water, then cooling the pulp so formed to precipitate the resins and wood fiber and collecting the floating rubber.

8. The method of treating rubber plants which comprises first removing the resins from the bark or skin, then grinding the plants in hot water, and causing the heated pulp to flow into cold water to precipitate the resins and wood fiber.

9. The method of treating rubber plants which comprises soaking the plants in water until the resins contained in the bark are exuded, then heating the plants with hot water to melt and float off the exuded resin, grinding the plants in hot water and causing the hot pulp to flow into cold water to separate the rubber.

In testimony that I claim the foregoing as my invention, I have signed my name in presence of two subscribing witnesses.

MORCRETTE DELAFOND.

Witnesses:
G. A. GUERRA,
NICAUDRO ARCOS.